United States Patent Office 3,399,237
Patented Aug. 27, 1968

3,399,237
ULTRAVIOLET LIGHT STABILIZERS FOR PLASTIC MATERIALS
Hans Dressler, Pitcairn, and Kenneth G. Reabe, Delmont, Pa., assignors to Koppers Company, Inc., a corporation of Delaware
No Drawing. Filed June 17, 1964, Ser. No. 375,950
3 Claims. (Cl. 260—591)

ABSTRACT OF THE DISCLOSURE

Novel compositions of matter having the formula:

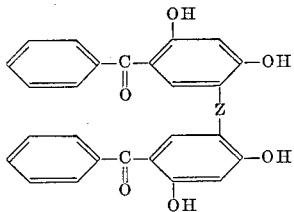

wherein Z is a member selected from the group consisting of sulfur, and

and R is a member selected from the group consisting of hydrogen and alkyl having from 1–11 carbon atoms. The compositions are useful as UV light stabilizers in polymers.

---

This invention relates to ultraviolet light stabilizers for plastics. In one specific aspect it relates to plastic compositions stabilized against degradation resulting from exposure to ultraviolet radiation.

It is well known that many plastic materials tend to undergo deterioration upon exposure to ultraviolet radiation. Light having wave lengths of about 290–400 millimicrons causes photocatalyzed changes, such as yellowing or embrittlement, in unstabilized polymers. This is particularly undesirable for colorless translucent and transparent plastics which are required to withstand long exposure to sunlight. To overcome this problem it is usually necessary to stabilize plastics, such as for use in translucent roofing transparent structures, protective coatings, impact resistant windows and decorative structures, which are subjected to prolonged exposure to ultraviolet radiation.

In recent years, organic compounds have become available which can absorb ultraviolet light and convert it to less harmful forms of energy such as heat, vibrational energy or less harmful radiation. These organic stabilizers, in addition to absorbing ultraviolet radiation in the selected range for the plastic material being treated, must be compatible with the plastic, have little or no initial color, be reasonably inexpensive, be chemically stable, and have a low toxicity especially for stabilizing plastics used in the food industry.

As a general rule, an effective ultraviolet light stabilizer should have a molar extinction coefficient $\epsilon$ of about 10,000, that is, the log $\epsilon$ of the molar extinction coefficient is equal to or greater than 4.0 in the 300–400 millimicron spectral region to have potential value as an ultraviolet light stabilizer for plastics. However, individual plastics are generally most susceptible to deterioration by radiation of particular wave lengths. Thus, polyethylene and polystyrene are susceptible to radiation having a wave length of 300–320 millimicrons, while polypropylene is most sensitive to radiation at 370 millimicrons. One disadvantage of presently available commercial stabilizers is that their extinction coefficent is too low over a broad band in the ultraviolet light region to be effective for general use.

Quite surprisingly we have discovered that certain 4-benzoylresorcinol derivatives are compatible with a large number of plastic materials and exhibit outstanding ultraviolet light absorbing properties over a wide range. These compounds do not impart any substantial color to transparent colorless plastics.

It is therefore an object of the present invention to provide a novel composition which is resistant to degradation by ultraviolet radiation.

It is another object of the present invention to provide plastic compositions containing the novel 4-benzoylresorcinol derivatives which are substantially resistant to ultraviolet deterioration.

In accordance with the present invention, we have discovered that derivatives of 4-benzoylresorcinol are particularly useful as ultraviolet light stabilizing agents for plastic materials. These compounds have the formula

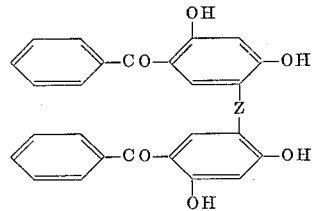

wherein Z is a member selected from the group consisting of sulfur and

and R is a member selected from the group consisting of hydrogen and alkyl having from 1–11 carbon atoms. The compounds of the present invention are particularly compatible with polyethylene and polypropylene and give excellent stabilization of these plastics against deterioration effects of ultraviolet light without causing any substantial discoloration of the plastics.

The novel ultraviolet light stabilizer can be readily incorporated into the plastic material by various standard procedures. In one technique, the dry stabilizer in powdered form is mixed with a powdered or granular plastic and the mixture is then appropriately treated by molding or extruding. In another procedure an aqueous suspension or emulsion of finely divided polymeric material may be admixed with a suspension or emulsion of the stabilizing agent. Alternatively it is possible to spray or mix a polymeric material in powdered or granular form with a solution or dispersion of the ultraviolet light absorbing agent in an appropriate solvent such as hexane or benzene. It is also possible to incorporate the ultraviolet absorbing agent in a finished article by introducing the plastic material into a bath containing the ultraviolet light absorbing agent in an appropriate liquid solvent and permitting the plastic material to remain in the bath for some time until the plastic has been properly treated. Thereafter, the material is dried to remove any of the remaining solvent. Plastic material in the form of fibers and films may also be sprayed with a solution or suspension of the agent absorbing ultraviolet rays in a solvent or dispersant by any standard technique.

The plastic material should contain a stabilizing amount of the ultraviolet light absorbing agent, that is, the amount of stabilizing agent sufficient to prevent deterioration and embrittlement of the plastic material. The amount of stabilizing agent to be used will depend to a large extent upon the amount of exposure to which plastic is subjected and the nature of the plastic to be treated. The agent is generally added in an amount of between 0.01 to 5 percent by weight of the plastic material and preferably between 0.1 to 4 percent by weight.

The stabilizing agent imparts protection against ultraviolet radiation to numerous plastic materials which are sensitive to ultraviolet light. These include, for example, clear films made of polyester resins, polyvinyl chloride and cellulose acetate which are used in packaging dye textile articles and automobile seat covers. The agent also protects flame resistant halogen containing polyesters and styrene modified maleate glycol resins used in the preparation of glass fiber reinforced structural panels which are subject to discoloration on outdoor exposure. The ultraviolet stabilizer is particularly effective for protecting polyethylene, polypropylene, polystyrene, polyvinyl acetate, polyvinyl chloride, copolymers of vinyl chloride and vinylidene chloride, cellulose resins such as nitrocellulose, ethylcellulose and cellulose acetate and numerous other materials. The agent can be used alone or together with other additives such as fillers, antioxidants, pigments, etc.

The invention is further illustrated in the following examples:

Example I

A 300 ml. flask equipped with stirrer, condenser, and thermometer was charged with 10.7 g. (0.05 mole) of 4-benzoylresorcinol, 100 ml. of benzene, 0.75 g. (0.025 mole) of flake paraformaldehyde and 4.0 ml. of 37 percent hydrochloric acid. The mixture was stirred and heated at 70° C. The initially clear yellow solution became turbid after 15 minutes and a bright yellow solid formed as heating continued. After three hours heating the mixture was cooled to room temperature and the thick, yellow slurry filtered. The filter cake was washed with benzene and air dried to obtain 8.9 grams (81 percent of theory) of 6,6'-methylenebis(4-benzoylresorcinol), M.P. 189–201° C. The infrared spectrum was consistent with the proposed structure. The product was very soluble in ethylene dichloride, o-dichlorobenzene, and monochlorobenzene but would not crystallize from these solvents, and was insoluble in other usual organic solvents.

The preparation was repeated at a fivefold scale to supply material for testing. With a reaction time of 4 hours at 70° C., a 93 percent of theory yield of product, 6,6'-methylenebis(4-benzoylresorcinol), M.P. 190–200° C., was obtained.

Example II

A solution of 10.7 g. (0.05 mole) of 4-benzoylresorcinol in 100 ml. of ethylene dichloride was stirred and refluxed, and a prepared solution of 3.0 g. (0.029 mole) of sulfur dichloride in 10 ml. of ethylene chloride was added dropwise during 10 minutes. Strong evolution of HCl occurred. The mixture was refluxed for two hours and then allowed to cool with stirring. A yellow solid precipitated which was filtered off, washed with water and dried in vacuo at 45–50° C. to obtain 4.5 g. of light yellow solid, M.P. 230–235° C.

The ethylene dichloride filtrate was washed with water and then with 100 ml. of 0.5 percent sodium carbonate solution which gave a very thick yellow emulsion. The emulsion did not break on prolonged standing and a yellow solid appeared to be present in the mixture. An attempt to filter the emulsion was unsuccessful. Neutralization with dilute hydrochloric acid broke the emulsion and gave a mixture which on filtration yielded 2.0 g. of product, M.P. 230–235° C.

The two products were combined and 4.0 grams were crystallized from 200 ml. of xylene to give 1.5 grams of light yellow crystals of 6,6'-thio-bis(4-benzoylresorcinol), M.P. 239–242° C. The product was characterized by infrared and its ultraviolet spectrum was determined.

Extraction of the ethylene dichloride layer of the filtrate with dilute sodium hydroxide and subsequent acidification of the extracts precipitated 4.0 grams (37 percent recovery) of unreacted 4-benzoylresorcinol, M.P. and mixed M.P. 140–44° C.

Example III

Following the procedure of Example II, a mixture of 21.4 g. (0.1 mole) of 4-benzoylresorcinol, 6.0 g. (0.058 mole) of sulfur dichloride and 200 ml. of ethylene dichloride was charged at room temperature and heated at 60–70° C. for 6.5 hours. The solution became turbid almost immediately, and after 30 minutes at the reaction temperature, yellow solids had formed in the mixture. After cooling, the thick yellow slurry was filtered and the filter cake washed with 600 ml. of water and sucked as dry as possible. The crude product was dissolved in 200 ml. of aqueous 5 percent sodium hydroxide solution at 50° C. and the reddish orange solution treated with decolorizing charcoal. No improvement in color resulted. The cooled filtrate was acidified with dilute hydrochloric acid to reprecipitate the product. The light yellow slurry was filtered, the cake washed with water until neutral, and dried in vacuo to give 18.7 g. (82 percent of theory) of 6,6'-thio-bis(4-benzoylresorcinol), M.P. 237–239° C.

Example IV

The products of Example I, 6,6'-methylenebis(4-benzoylresorcinol) and Example II, 6,6'-thio-bis(4-benzoylresorcinol) were tested to determine their ability to stabilize polystyrene against ultraviolet light degradation. The stabilizers, in varying amounts, were blended with 100 parts of polystyrene beads by rolling in a jar mill. The stabilized bead samples and a control sample were extruded into pellets from which discs 2 inches in diameter and ⅛ inch thick were molded by injection molding. These molded discs were then exposed to ultraviolet radiation under a 325 watt Hanovia lamp for 120 hours. A Yellowness Index, which represents the relative degree of yellow coloration based upon spectrophotometric analysis, was determined for the samples of each of the compositions. The difference in the Yellowness Index before and after exposure or the amount of discoloration caused by the ultraviolet radiation is designated as the "Yellowness Factor." Results of the test are given in the table below.

TABLE I

| Stabilizer | Weight Percent | Yellowness Factor |
| --- | --- | --- |
| 6,6'-methylenebis(4-benzoylresorcinol) | 0.1 | −0.7 |
| Do | 0.05 | 0.5 |
| Do | 0.02 | 2.5 |
| 6,6'-thio-bis(4-benzoylresorcinol) | 0.1 | 1.4 |
| Do | 0.05 | 3.5 |
| Do | 0.02 | 5.4 |
| Control | None | 6.9 |

Example V

One part of 6,6'-methylenebis(4-benzoylresorcinol) is blended with 100 parts of low density polyethylene and 0.05 part 4,4'-thio-bis(6-t-butyl-m-cresol) by milling on a two roll mill at 320° F. for five minutes. Another sample is prepared by blending one part 6,6'-thio-bis(4-benzoylresorcinol) with 100 parts of low density polyethylene. The clear thin films, 0.05 mm. thick, are molded from the stabilized resin and visual inspection indicates that the resin and the stabilizer are completely compatible. These films are exposed for 500 hours to the light of an ultraviolet lamp. The stabilized films remained substantially unchanged and no embrittlement can be ascertained while the unstabilized films show discoloration and embrittlement.

Similar results are obtained when polypropylene, copolymers of vinylidine chloride and vinyl chloride, or styrene modified maleic-glycol polyesters are used in the foregoing example.

We claim:

1. A composition of matter having the formula:

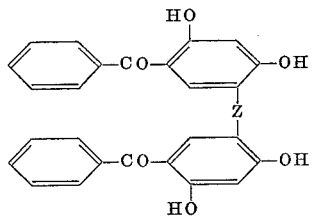

wherein Z is a member selected from the group consisting of sulfur and

and R is a member selected from the group consisting of hydrogen and alkyl having from 1–11 carbon atoms.

2. The composition according to claim 1 wherein Z is sulfur.

3. The composition according to claim 1 wherein R is hydrogen.

References Cited

UNITED STATES PATENTS

| | | | |
|---|---|---|---|
| 2,787,607 | 4/1957 | Havens et al. | 260—591 |
| 3,123,647 | 3/1964 | Duennenberger et al. | 260—591 |
| 3,146,269 | 8/1964 | Braus et al. | 260—591 |

DANIEL D. HORWITZ, *Primary Examiner.*